US009833700B2

(12) United States Patent
Higgins et al.

(10) Patent No.: US 9,833,700 B2
(45) Date of Patent: Dec. 5, 2017

(54) CONNECTABLE HAND-HELD CONTROLLERS FOR VIRTUAL-REALITY SYSTEMS

(71) Applicant: OCULUS VR, LLC, Menlo Park, CA (US)

(72) Inventors: Jason Andrew Higgins, Seattle, WA (US); Peter Wesley Bristol, Seattle, WA (US); Benjamin E. Tunberg Rogoza, Seattle, WA (US)

(73) Assignee: OCULUS VR, LLC, Menlo Park, CA (US)

( * ) Notice: Subject to any disclaimer, the term of this patent is extended or adjusted under 35 U.S.C. 154(b) by 210 days.

(21) Appl. No.: 14/737,151

(22) Filed: Jun. 11, 2015

(65) Prior Publication Data

US 2016/0361637 A1 Dec. 15, 2016

(51) Int. Cl.
*A63F 9/24* (2006.01)
*A63F 13/24* (2014.01)
*G06F 3/01* (2006.01)
*A63F 13/213* (2014.01)
*A63F 13/2145* (2014.01)
*A63F 13/00* (2014.01)

(52) U.S. Cl.
CPC ............ *A63F 13/24* (2014.09); *A63F 13/213* (2014.09); *A63F 13/2145* (2014.09); *G06F 3/011* (2013.01); *A63F 13/00* (2013.01)

(58) Field of Classification Search
CPC .................................. A63F 13/06; G06F 3/011
See application file for complete search history.

(56) References Cited

U.S. PATENT DOCUMENTS

| 4,518,164 A | * | 5/1985 | Hayford, Jr. | ............ A63F 13/06 108/43 |
| 4,552,360 A | * | 11/1985 | Bromley | .................. A63F 13/06 345/159 |
| 5,421,590 A | * | 6/1995 | Robbins | .................. A63F 13/06 273/148 B |
| 5,479,163 A | * | 12/1995 | Samulewicz | ......... G06F 3/0219 341/20 |

(Continued)

OTHER PUBLICATIONS

"Hands-On with Sixense STEM VR Motion-Tracking System" written by Tested, accessed and printed from URL <https://www.youtube.com/watch?v=C8z-On6FBTM>, 5 pages.*

(Continued)

*Primary Examiner* — Jason Skaarup
(74) *Attorney, Agent, or Firm* — Morgan, Lewis & Bockius LLP

(57) ABSTRACT

There is provided a pair of handheld controllers for a virtual-reality system. The pair of hand-held controllers for the virtual-reality system comprises a first hand-held controller and a second hand-held controller. The first hand-held controller comprises a first user-input surface having a first user-input key, a first grip, and a first cage having a first connector coupled to a surface of the first cage. The second hand-held controller comprises a second user-input surface having a second user-input key, a second grip, and a second cage having a second connector coupled to a surface of the second cage. The first and second connectors are configured to detachably couple the first cage to the second cage.

17 Claims, 3 Drawing Sheets

(56) References Cited

U.S. PATENT DOCUMENTS

| | | | | |
|---|---|---|---|---|
| 5,551,701 A * | 9/1996 | Bouton | ............... | A63F 13/06 |
| | | | | 273/148 B |
| 5,616,078 A * | 4/1997 | Oh | ............... | A63F 13/06 |
| | | | | 345/156 |
| 5,645,277 A * | 7/1997 | Cheng | ............... | A63F 13/06 |
| | | | | 273/148 B |
| 6,572,108 B1 * | 6/2003 | Bristow | ............... | A63F 13/06 |
| | | | | 273/148 B |
| 6,652,383 B1 * | 11/2003 | Sonoda | ............... | A63F 13/12 |
| | | | | 463/40 |
| 7,331,793 B2 * | 2/2008 | Hernandez | ............... | H01F 38/14 |
| | | | | 439/38 |
| 8,267,786 B2 * | 9/2012 | Ikeda | ............... | A63F 13/06 |
| | | | | 463/36 |
| 8,439,753 B2 * | 5/2013 | Wakitani | ............... | A63F 13/06 |
| | | | | 273/148 B |
| 8,882,596 B2 * | 11/2014 | Shimamura | ............... | A63F 13/428 |
| | | | | 463/37 |
| D772,986 S * | 11/2016 | Chen | ............... | D14/203.3 |
| 9,678,566 B2 * | 6/2017 | Webb | ............... | G06F 3/011 |
| 2001/0045938 A1 * | 11/2001 | Willner | ............... | A63F 13/06 |
| | | | | 345/156 |
| 2003/0100367 A1 * | 5/2003 | Cooke | ............... | A63F 13/02 |
| | | | | 463/36 |
| 2004/0222970 A1 * | 11/2004 | Martinez | ............... | A63F 13/06 |
| | | | | 345/169 |
| 2005/0255915 A1 * | 11/2005 | Riggs | ............... | A63F 13/06 |
| | | | | 463/37 |
| 2006/0287089 A1 * | 12/2006 | Addington | ............... | A63F 13/06 |
| | | | | 463/37 |
| 2007/0049374 A1 * | 3/2007 | Ikeda | ............... | A63F 13/06 |
| | | | | 463/30 |
| 2007/0066394 A1 * | 3/2007 | Ikeda | ............... | A63F 13/06 |
| | | | | 463/37 |
| 2007/0293318 A1 * | 12/2007 | Tetterington | ............... | A63F 13/06 |
| | | | | 463/37 |
| 2008/0261693 A1 * | 10/2008 | Zalewski | ............... | G06F 3/0304 |
| | | | | 463/31 |
| 2008/0261695 A1 * | 10/2008 | Coe | ............... | A63F 13/22 |
| | | | | 463/37 |
| 2009/0005164 A1 * | 1/2009 | Chang | ............... | A63F 13/06 |
| | | | | 463/37 |
| 2009/0149256 A1 * | 6/2009 | Lui | ............... | A63F 13/02 |
| | | | | 463/37 |
| 2009/0298590 A1 * | 12/2009 | Marks | ............... | A63F 13/02 |
| | | | | 463/37 |
| 2010/0118195 A1 * | 5/2010 | Eom | ............... | G08C 17/00 |
| | | | | 348/564 |
| 2011/0294579 A1 * | 12/2011 | Marks | ............... | A63F 13/245 |
| | | | | 463/36 |
| 2012/0088582 A1 * | 4/2012 | Wu | ............... | A63F 13/24 |
| | | | | 463/37 |
| 2012/0202597 A1 * | 8/2012 | Yee | ............... | A63F 13/235 |
| | | | | 463/37 |
| 2014/0015813 A1 * | 1/2014 | Numaguchi | ............... | G06F 3/01 |
| | | | | 345/184 |
| 2014/0141891 A1 * | 5/2014 | Georgy | ............... | A63F 13/02 |
| | | | | 463/47 |
| 2014/0228124 A1 * | 8/2014 | Plagge | ............... | G08C 23/04 |
| | | | | 463/39 |
| 2014/0273546 A1 * | 9/2014 | Harmon | ............... | H01R 13/6205 |
| | | | | 439/39 |
| 2014/0362110 A1 * | 12/2014 | Stafford | ............... | G06F 3/013 |
| | | | | 345/633 |
| 2014/0364212 A1 * | 12/2014 | Osman | ............... | A63F 13/213 |
| | | | | 463/31 |
| 2015/0094142 A1 * | 4/2015 | Stafford | ............... | A63F 13/212 |
| | | | | 463/31 |
| 2015/0234477 A1 * | 8/2015 | Abovitz | ............... | G06K 9/00671 |
| | | | | 382/103 |
| 2015/0258431 A1 * | 9/2015 | Stafford | ............... | A63F 13/213 |
| | | | | 463/31 |
| 2015/0258432 A1 * | 9/2015 | Stafford | ............... | A63F 13/213 |
| | | | | 463/32 |
| 2016/0357249 A1 * | 12/2016 | Webb | ............... | G06F 3/011 |
| 2016/0357261 A1 * | 12/2016 | Bristol | ............... | G06F 3/017 |
| 2016/0361637 A1 * | 12/2016 | Higgins | ............... | A63F 13/24 |
| 2016/0361638 A1 * | 12/2016 | Higgins | ............... | A63F 13/24 |
| 2016/0363996 A1 * | 12/2016 | Higgins | ............... | G06F 3/014 |

OTHER PUBLICATIONS

"STEM System" accessed and printed from URL <http://sixense.com/wireless>, 5 pages.*

* cited by examiner

CONNECTABLE HAND-HELD CONTROLLERS FOR VIRTUAL-REALITY SYSTEMS

TECHNICAL FIELD

This application relates generally to gaming entertainment and virtual-reality systems, and more specifically to a pair of hand-held controllers detachably coupled to each to allow a user to connect and disconnect the hand-held controller held in a left hand from the hand-held controller held in the right hand. The pair of hand-hand controllers is capable of being sensed or tracked by an image capturing device of a virtual-reality system in order to detect the user's hand movements.

BACKGROUND

Gaming entertainment systems typically include a hand-held controller or other controller. A user manipulates the controller to send commands or other instructions to the gaming entertainment system to control a video game or other simulation. For example, the controller may be provided with several buttons or knobs operated by the user, such as a joystick.

Conventional gaming controllers typically merely provide buttons or knobs for operation by the user, where each of the buttons or knobs corresponds to a desired action to be carried out on a display of the gaming entertainment or virtual-reality system. The action carried out on the screen is not representative of a motion that the user is physically making, and therefore has less of a feeling of "reality" to the user. As such, conventional controllers lack capability of being tracked to simulate actual motion of a user holding the controller and enhance the user virtual-reality experience.

Furthermore, conventional gaming controllers are typically provided as separate controllers to be held in either of a left hand or a right hand of a user. As such, conventional hand-held controllers lack the capability of detachable coupling for the user to selectively couple the two controllers (one to be held in the left hand and another to be held in the right hand of the user) so as to free up one of the user's hands without having to put down one of the hand-held controllers.

SUMMARY

Accordingly, there is a need for hand-held controllers capable of detachable coupling for the user to selectively couple the two controllers (one to be held in the left hand and another to be held in the right hand of the user) so as to free up one of the user's hands without having to put down one of the hand-held controllers.

In accordance with some embodiments, a pair of hand-held controllers for a virtual-reality system comprises a first hand-held controller and a second hand-held controller. The first hand-held controller comprises a first user-input surface having a first user-input key, a first grip, and a first cage having a first connector coupled to a surface of the first cage. The second hand-held controller comprises a second user-input surface having a second user-input key, a second grip, and a second cage having a second connector coupled to a surface of the second cage. The first and second connectors are configured to detachably couple the first cage to the second cage. The hand-held controllers are thus connectable.

In some embodiments, the first and second connectors are configured to detachably couple the first cage to the second cage at a first position on an outer surface of the first cage and a corresponding second position on an outer surface of the second cage.

In some embodiments, the first and second connectors comprise first and second magnets to magnetically couple the first cage and the second cage to each other at the first and second positions.

In some embodiments, the first connector comprises a hook surface of a hook-and-loop fastener at the first position, and the second connector comprises a loop surface of the hook-and-loop fastener at the second position.

In some embodiments, the first connector comprises a first disc at the first position, and the first disc is configured to have a protrusion protruding from a surface of the first connector. The second connector comprises a second disc at the second position, and the second disc is configured to have a groove at a position on a surface of the second disc corresponding to a position of the protrusion on the first disc. The first cage and the second cage are coupled by insertion of the protrusion into the groove.

In some embodiments, the first and second connectors comprise snap fasteners.

In some embodiments, the first connector comprises an adhesive on a first surface of the first connector to couple the first connector to the first cage and an adhesive on a second surface of the first connector. The second connector comprises an adhesive on a first surface of the second connector to couple the second connector to the second cage and an adhesive on a second surface of the second connector. The adhesives on the second surfaces of the first and second connectors are to detachably couple the first and second connectors.

In some embodiments, the surfaces of the first and second cages, to which the first and second connectors are respectively coupled, are outer surfaces. The first cage and the second cage each comprise a plurality of illumination sources on the outer surfaces of the first cage and the second cage respectively.

In some embodiments, at least a portion of the plurality of illumination sources on each of the first and second cages are positioned to be visible to a forward-looking camera on a head-mounted display worn by a user when the user holds the first and second grips in a neutral position.

In some embodiments, the plurality of illumination sources on each of the first and second cages comprises a plurality of light-emitting diodes (LEDs).

In some embodiments, the first hand-held controller further comprises a first power source to supply power to the first user-input surface and the plurality of LEDs on the first cage, and the second hand-held controller further comprises a second power source to supply power to the second user-input surface and the plurality of LEDs on the second cage.

In some embodiments, the plurality of illumination sources on each of the first and second cages comprises a plurality of passive reflectors.

In some embodiments, the pair of hand-held controllers further comprises a first structural web coupling the first cage to the first user-input surface and a second structural web coupling the second cage to the second user-input surface.

In some embodiments, the pair of hand-held controllers further comprises a third user-input key on the first user-input surface, and a fourth user-input key on the second user-input surface. The third user-input key is a trigger mounted on at least one of the first structural web and the first grip at a position configured to be actuated by a middle finger of the user. The fourth user-input key is another trigger mounted on at least one of the second structural web and the second grip at a position configured to be actuated by another middle finger of the user.

In some embodiments, each of the first and second user-input keys is selected from the group consisting of a thumbstick, a button, a trigger, and a directional pad.

In some embodiments, the first user-input surface comprises a first plurality of user-input keys including the first user-input key and the second user-input surface comprises a second plurality of user-input keys including the second user-input key. Respective user-input keys of the first and second pluralities of user-input keys are selected from the group consisting of a thumbstick, a button, a trigger, and a directional pad.

In some embodiments, the first and second user-input surfaces each form an inner front surface of the first and second cages respectively.

In some embodiments, the first and second cages each comprise an over-molded rubber material or a hard plastic.

In accordance with some embodiments, a first hand-held controller for a virtual-reality system comprises a first user-input surface having a first user-input key, a first grip, and a first cage having a first connector coupled to a surface of the first cage. The first connector is configured to detachably couple to a second connector on a second cage of a second hand-held controller.

In accordance with some embodiments, a pair of hand-held controllers for a virtual-reality system comprises a first hand-held controller and a second hand-held controller. The first hand-held controller comprises a first user-input surface having a first user-input key, a first grip, and a first cage having a first connector coupled to an outer surface of the first cage. The second hand-held controller comprises a second user-input surface having a second user-input key, a second grip, and a second cage having a second connector coupled to an outer surface of the second cage. The first and second connectors are configured to detachably couple the first cage to the second cage. The first cage and the second cage each comprise a plurality of illumination sources on the outer surfaces of the first cage and the second cage respectively.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
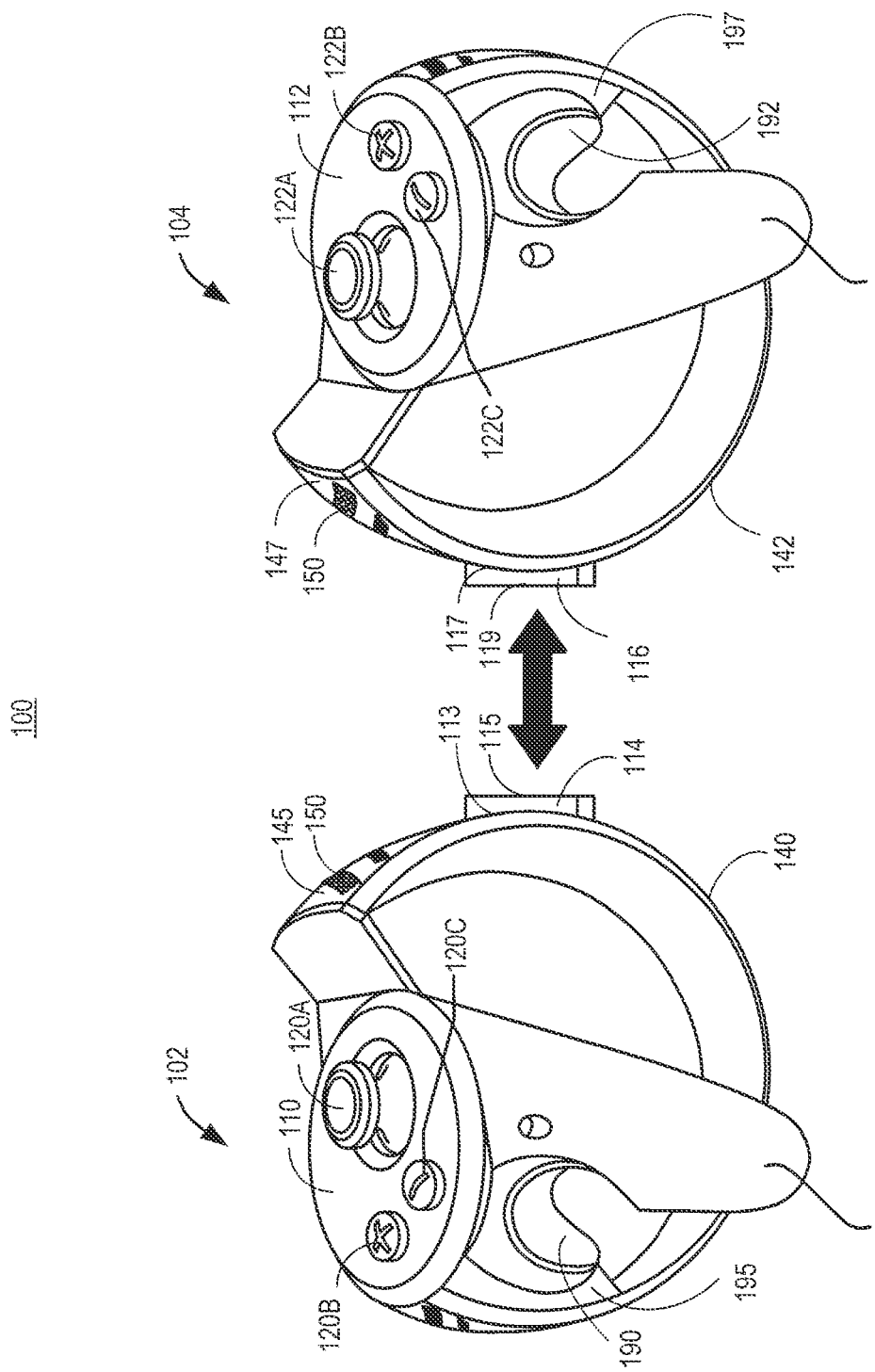
FIG. 1 illustrates an isometric view of an exemplary pair of hand-held controllers in accordance with some embodiments.

Hand-held controllers are typically held in either or both hands by a user while playing a video game or carrying out some other virtual-reality activity in order to operate user-input keys (e.g., buttons) on the controller. While playing the game or carrying out the virtual-reality activity, the user may become so immersed in the game as to move their hands in a manner mimicking a desired action (e.g., performed by pressing one of the buttons while holding the controller). For example, during playing a boxing game a user may press an "L" button corresponding to a left hand punch while simultaneously jerking their left hand for a more real sensation. It is desirable to display a corresponding motion by an image subject on the screen.

When using two hand-held controllers, the user typically has his/her hands full holding one hand-held controller in each hand. It is desirable to have a pair of hand-held controllers which are detachably coupled to each other in order to allow the user to couple the pair of hand-held controllers to each other and to allow the user to hold the pair of coupled hand-held controllers in one hand as necessary, thereby freeing up the other hand for the user to use as he/she pleases. The configuration of the pair of hand-held controllers allows the user to not have to put down one of the hand-held controllers and then have to reach back to pick it up again, and thereby potentially interrupt the virtual-reality experience while doing so.

Accordingly, the present disclosure describes a pair of hand-held controllers configured to allow easy tracking of their movements in accordance with some embodiments. The sensed movements of the pair of hand-held controllers may be used as additional commands to control various aspects of the game or other simulation being played. Furthermore, the hand-held controllers are connectable.

In some embodiments a pair of hand-held controllers includes a first hand-held controller and a second hand-held controller. The first hand-held controller comprises a first user-input surface having a first user-input key, a first grip coupled to the first user-input surface, and a first cage coupled to the first user-input surface and having a first connector coupled to a surface of the first cage. The second hand-held controller comprises a second user-input surface having a second user-input key, a second grip coupled to the second user-input surface, and a second cage coupled to the second user-input surface and having a second connector coupled to a surface of the second cage. The first and second connectors are configured to detachably couple the first cage to the second cage.

The first hand-held controller and the second hand-held controller thus can be detachably coupled so as to allow the user to be able to hold the pair of hand-held controllers using one hand as necessary, without having to put down one of the controllers, thereby eliminating potential interruption of the virtual-reality experience caused by having to put down and then reach back down to pick up one of the hand-held controllers. The configuration of the pair of hand-held controllers thereby allows the user freedom to use the other hand for any other purpose to enhance the virtual-reality gaming experience.

In some embodiments the pair of hand-held controllers includes illumination sources coupled to outer surfaces of the first cage and the second cage of the controller, respectively. The illumination sources are configured to emit or reflect light which is detectable by an image-capturing device (e.g. a camera) used in conjunction with a head-mounted display in a virtual-reality system. Motion of the illumination sources on the pair of hand-held controllers may be detected and used to model actions of the user's hand(s) in the virtual-reality system. Various motions of the pair of hand-held controllers may be detectable, such as punching movements, throwing movements, hitting movements when playing a sport, and the like. Motions of the pair of hand-held controllers correspond to various commands such that the motions are transferred into actions in the virtual-reality system.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user-input key could be termed a second user-input key, and, similarly, a second user-input key could be termed a first user-input key, without departing from the scope of the various described embodiments. The first user-input key and the second user-input key are both user-input keys, but they are not the same user-input key.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a pair of hand-held controllers 100 in accordance with some embodiments. The pair of hand-held controllers 100 generally comprises a first hand-held controller 102 and a second hand-held controller 104. The first hand-held controller 102 comprises a first user-input surface 110 having a first user-input key 120A, a first grip 130 coupled to the first user-input surface 110, and a first cage coupled 140 to the first user-input surface 110 and having a first connector 114 coupled to a surface of the first cage 140. The second hand-held controller 104 comprises a second user-input surface 112 having a second user-input key 122A, a second grip 132 coupled to the second user-input surface 112, and a second cage 142 coupled to the second user-input surface 112 and having a second connector 116 coupled to a surface of the second cage 112. The first and second connectors 114 and 116 are configured to detachably couple the first cage 140 to the second cage 142.

In some embodiments, the first and second connectors 114 and 116 are configured to detachably couple the first cage 140 to the second cage 142 at a first position on an outer surface 145 of the first cage and a corresponding second position on an outer surface 147 of the second cage. The first position and the second position are mirrored with respect to each other on the respective first and second cages 140 and 142. Given this configuration, the first position on the first cage 140 matches the second position on the second cage 142, to allow contact to be made easily between the first and second connectors 114 and 116 when the pair of hand-held controllers 100 are held in a user's hands.

In some embodiments, the first connector 114 and the second connector 116 are permanently coupled to the respective first cage 140 and second cage 142. For example, the first connector 114 and the second connector 116 may be glued to the respective first cage 140 and second cage 142. Alternatively, the first connector 114 and the second connector 116 may be sewn, stapled, or mechanically fused (e.g. ultrasonically welded or melted) to the respective first cage 140 and second cage 142, or embedded in the respective first cage 140 and second cage 142.

In some embodiments, the first connector 114 and the second connector 116 are detachably coupled to the respective first cage 140 and second cage 142.

In some embodiments, the first and second connectors 114 and 116 comprise respective first and second magnets to magnetically couple the first cage 140 and the second cage 142 to each other at the first and second positions.

In some embodiments the first connector comprises a hook surface of a hook-and-loop fastener at the first position and the second connector comprises a loop surface of the hook-and-loop fastener at the second position. The hooks are configured to hook and engage the loops, thereby coupling the first and second connectors 114 and 116.

In some embodiments the first connector 114 and second connector 116 comprise a first disc at the first position and a second disc at the second position. The first disc is configured to have a protrusion protruding from a surface of the first connector 114. The second disc is configured to have a groove at a position on a surface of the second disc corresponding to a position of the protrusion on the first disc. The first cage 140 and the second cage 142 are detachably coupled by insertion of the protrusion into the groove.

In some embodiments, the first and second connectors 114 and 116 comprise snap fasteners.

In some embodiments, the first connector 114 comprises an adhesive on a first surface 113 thereof to couple the first connector 114 to the first cage 140 and an adhesive on a second surface 115 of the first connector 114. The second connector 116 comprises an adhesive on a first surface 117 of the second connector 116 to couple the second connector to the second cage 142 and an adhesive on a second surface 119 of the second connector 116. The adhesives on the second surfaces 115 and 119 of the first and second connectors 114 and 116 are to detachably couple the first and second connectors 114 and 116. The adhesives on the second surfaces 115 and 119 of the first and second connectors 114 and 116 are semi-permanent adhesives so as to allow for the first and second cages 140 and 142 to be detachably coupled to each other.

In some embodiments, the adhesives on the first surfaces 113 and 117 of the first and second connectors 114 and/or 116 comprise permanent adhesives to permanently connect the first connector 114 to the first cage 140 and the second connector 116 to the second cage 142. Alternatively, the adhesives on the first surfaces 113 and/or 117 of the first and second connectors 114 and 116 comprise semi-permanent adhesives to allow the first and second connectors 114 and 116 to be removed from the respective first cage 140 and second cage 142.

In some embodiments, the first surfaces of the first and second cages 140 and 142, to which the first and second connectors 113 and 117 are respectively coupled, are outer surfaces 145 and 147 of the respective cages 140 and 142. The first cage 140 and the second cage 142 each comprise a plurality of illumination sources 150 on the outer surfaces 145 and 147 of the first cage 140 and the second cage 142. Examples of illumination sources 150 are described below.

In some embodiments, the first user-input surface 110 includes a plurality of user-input keys 120A, 120B and 120C, and the second user-input surface 112 includes a plurality of user-input keys 122A, 122B and 122C. Alternatively, the first and second user-input surfaces 110 and 112 each includes a single user-input key. A user-input key is a button, knob, switch, thumbstick, directional pad, or any other such part that a user presses or manipulates in some other way to carry out a specific action in a virtual-reality system (e.g., during gaming). In the example of FIG. 1, the user-input keys of the first user-input surface 110 include a thumbstick 120A and buttons 120B and 120C. The user-input keys of the second user-input surface 112 include a thumbstick 122A and buttons 122B and 122C. Thus, the user-input surfaces 110 and 112 are surfaces on the respective first and second hand-held controllers 102 and 104 where the user delivers an input by activating one or more user-input keys (e.g., by pressing a button or pushing a knob) corresponding to an action that the user desires to carry out in the virtual-reality system.

Each of the user-input keys 120A, 120B, 120C, 122A, 122B and 122C is configured to communicate with the virtual-reality system so as to translate an operation of the user-input key by the user into a corresponding action in the virtual-reality system.

In some embodiments, the first user-input key 120A and the second user-input key 122A are each selected from the group consisting of a thumbstick, a button, a trigger, and a directional pad.

In some embodiments, the first and second user-input keys 120A and 122A are each a button selected from the group consisting of an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the virtual-reality (e.g., gaming) experience, and the back and forward buttons may indicate a direction in which the user desires the image subject to move. The home button may be a button activated to return the gaming experience back to a main menu or to start the game or activity from the beginning.

In some embodiments, the first user-input surface 110 comprises a first plurality of user-input keys including the first user-input key 120A, and respective user-input keys of the plurality of user-input keys of the first user-input surface 110 are selected from the group consisting of a thumbstick, a button, a trigger, and a directional pad. Similarly, the second user-input surface 112 comprises a second plurality of user-input keys including the second user-input key 122A, and respective user-input keys of the plurality of user-input keys of the second user-input surface 112 are selected from the group consisting of a thumbstick, a button, a trigger, and a directional pad.

In some embodiments, the home button is positioned further away from the other user-input keys. This configuration would allow for user-input keys that are used most (e.g. a directional pad used to dictate a direction of movement of the image subject, e.g., up-down-left-right) to be placed closer to the vicinity of the fingers and thumb. This configuration provides the advantage that the user would need to reach less to press the more frequently used user-input keys, thereby mitigating the possibility of ergonomic ailments associated with overreaching and overstretching fingers.

In some embodiments, the first grip 130 is coupled to the first user-input surface 110 and the second grip 132 is coupled to the second user-input surface 112. The first and second grips 130 and 132 are protruding structures of the respective first and second hand-held controllers 102 and 104 which the user grips in each hand to hold the pair of hand-held controllers 100. This configuration allows for the user to be able to grip each of the first and second hand-held controllers 102 and 104 between a palm and fingers (e.g., three or less fingers) while freeing up the thumbs and, in some embodiments, other fingers (e.g. the middle fingers), for operating the user-input keys 120A, 120B, 120C, 122A, 122B and 122C. In some embodiments, one middle finger is freed to operate a trigger 190 mounted at least in part on the first grip 130, and the other middle finger is freed to operate a trigger 192 mounted at least in part on the second grip 132 as shall be described below.

In some embodiments the first grip 130 is a separate part of the first hand-held controller 102 that is removably coupled to the first user-input surface 110, and the second grip 132 is a separate part of the second hand-held controller 104 that is removably coupled to the first user-input surface 110. The first grip 130 and the first user-input surface 110 and the second grip 132 and the second user-input surface 112 may each be coupled by a method appropriate for their materials of construction. For example, the first grip 130 and first user-input surface 110 may be formed of a hard plastic and may be coupled to each other by ultrasonic welding. Alternatively, the first grip 130 and the first user-input surface 110 may be coupled to each other by a fastening mechanism such as a screw or a bolt, or may be threadedly engaged with each other. Similarly, the second grip 132 and second user-input surface 112 may be formed of a hard plastic and may be coupled to each other by ultrasonic welding, or alternatively coupled to each other by a fastening mechanism such as a screw or a bolt, or may be threadedly engaged with each other.

In some embodiments, the grip 130 is integrally formed with the user-input surface 110 as one part and the second grip 132 is integrally formed with the second user-input surface 112 as one part (e.g., which may be formed from molding).

In some embodiments, the first grip 130 is slanted at a predetermined angle with respect to the first user-input surface 110 and the second grip 132 is slanted at a predetermined angle with respect to the second user-input surface 112 (e.g., with respect to a plane through the respective user-input surface 110, 112 or a portion thereof) in order to provide a comfortable (e.g., optimum) ergonomic balance for a user between holding each grip 130, 132 in a hand and using a thumb to operate the at least one user-input key of each of the respective first and second user-input surfaces 110 and 112.

In some embodiments, the first cage 140 is coupled to the first user-input surface 110, and the second cage 142 is coupled to the second user-input surface 112. The first and second cages 140 and 142, which may also be referred to as tracking cages, each have a surface (e.g., an outer surface 145 of the first cage 140 and an outer surface 147 of the second cage 142) on which a plurality of illumination sources 150 are positioned. The illumination sources 150 are positioned to be visible to an external image-capture device (e.g., camera), which detects movement of the illumination sources 150 when a user makes a motion (e.g., waving, swinging, punching, shaking, or any other hand motion) while holding the first and second grips 130 and 132 of the pair of hand-held controllers 100. In some embodiments, each of the first and second cages 140 and 142 is positioned such that it is located above the user's hand when the user holds one or both of the respective grips 130 in a neutral position. Given this orientation, the outer surfaces 145 and 147 of the first and second cages 140 and 142 are visible to an image-capturing device (e.g., a forward-looking camera 210 on a head-mounted display 200 worn by the user, or alternatively an external camera separate from the head-mounted display). A neutral position refers to when users hold the pair of hand-held controllers 100 in front of them with each of the first and/or second grips 130 and 132 between a palm and fingers and otherwise relax their arms and wrists.

Figure 2:
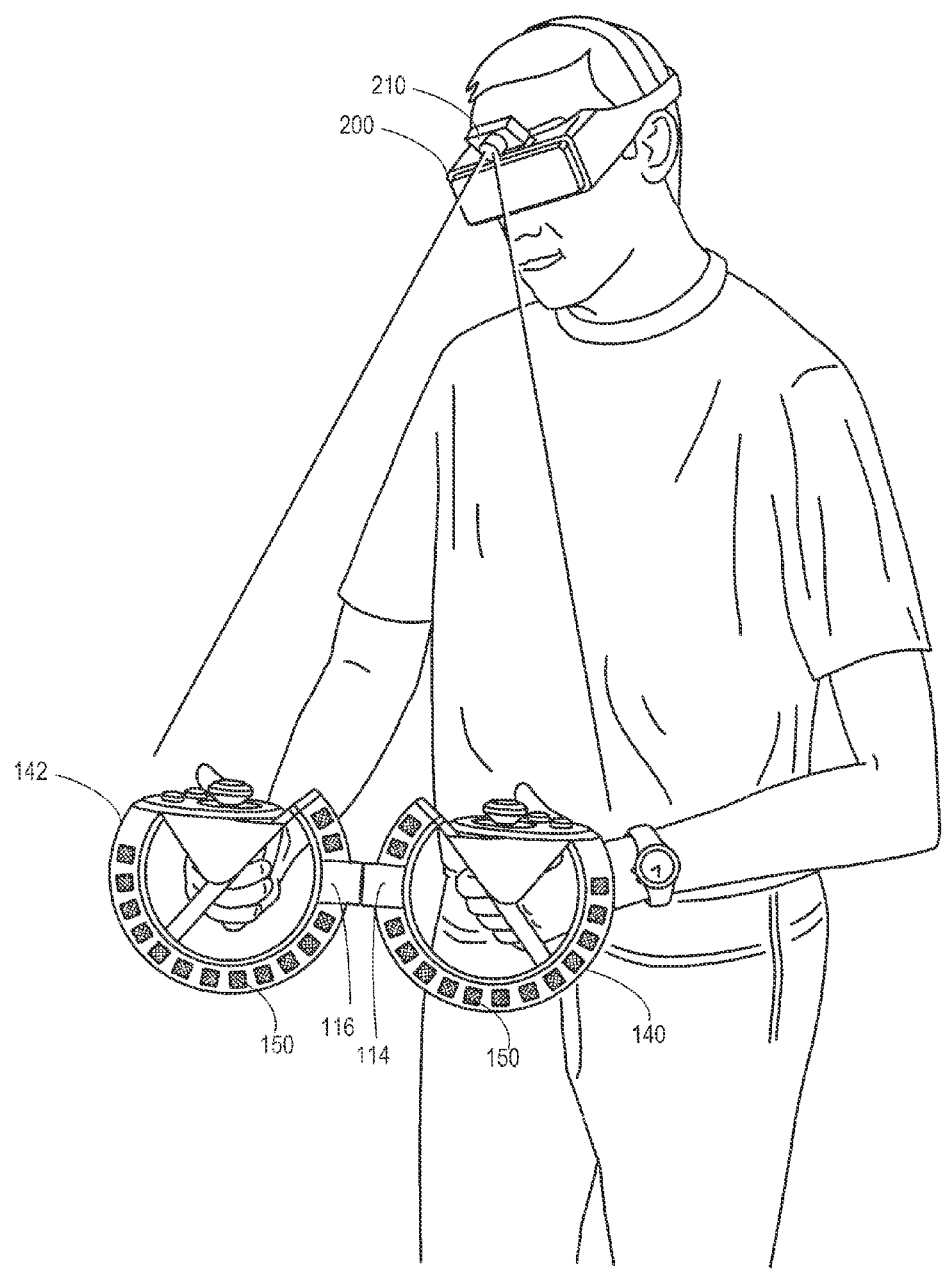
FIG. 2 illustrates the exemplary pair of hand-held controllers used in conjunction with a head-mounted display and front-facing camera in accordance with some embodiments.

In the example of FIG. 1 and FIG. 2, the first user-input surface 110 is outward-facing with respect to the first cage 140 and the second user-input surface 112 is outward-facing with respect to the second cage 142. Alternatively, the first and second user-input surfaces 110 and 112 may each be inward-facing with respect to the corresponding first and second cages 140 and 142. For example, in some embodiments the first user-input surface 110 forms an inner front surface of the first cage 140 or is contiguous with the inner surface of the cage 140. Similarly, in some embodiments the second user-input surface 112 forms an inner front surface of the second cage 142 or is contiguous with the inner surface of the second cage 142.

FIG. 2 illustrates the pair of hand-held controllers 100 used in conjunction with a head-mounted display 200 that has a front-facing (i.e., forward-looking) camera 210 in accordance with some embodiments. The forward-looking camera 210 is positioned on the head-mounted display 200 (e.g., at a downward facing angle) such that the first and second cages 140 and 142 are each within view when the user holds the respective grips 130 and 132 in the neutral position. Furthermore, at least a portion of the illumination sources 150 are positioned on the first and second cages 140 such that they are visible to the forward-looking camera 210 when the user holds the first and second grips 130 and 140 in the neutral position. This way, the camera 210 is able to sense and detect a position of the controller 100 based on light emitted or reflected by at least one of the plurality of illumination sources 150 as described below.

Alternatively, or in addition, an external image-capture device (e.g., camera) is positioned in front of the user. At least a portion of the illumination sources 150 are positioned on the first and second cages 140 and 142 such that they face away from the user, and thus are visible to the external image-capture device, when the user holds the first and second grips 130 and 132 in the neutral position.

In some embodiments, the illumination sources 150 are light emitting diodes (LEDs). In some embodiments, the LEDs are infrared (IR) LEDs. The LEDs may be positioned on the surfaces (e.g., outer surface 145 of the first cage 140 and outer surface 147 of the second cage 142) in any suitable pattern, order, or array. For example, they may be positioned linearly, in a circular pattern, a rectangular pattern, a hex- agonal pattern, or any other desired pattern to provide visibility to the camera 210. The LEDs may be fixedly or detachably positioned on the first and second cages 140 and 142 by any appropriate method. For example, the LED's may be mounted on or embedded within the surfaces of the first and second cages 140 and 142 (e.g. outer surface 145 and 147). Alternatively, the LEDs may be on sleeves that surround each of the first and second cages 140 and 142 and effectively form the outer surfaces 145 and 147 of the respective first and second cages 140 and 142. Although the LEDs are described as being positioned on the outer surfaces 145 and 147 of the first and second cages 140 and 142, they may additionally or alternatively be coupled to any other surface on the first and second cages 140 and 142 and/or the rest of the pair of hand-held controllers 100. Additionally, the illumination sources 150 may be another type of illumination source (e.g., passive reflectors).

The LEDs are electrically connected to power sources which may or may not be same power sources providing power to the first and second user-input surfaces 110 and 112. The pair of hand-held controller may be wireless, therefore, the power sources may be batteries. The LEDs may be housed in diffused cases including a current limiting resistor to keep the current from the power source to the LED below the LED's maximum current rating so as to ensure maximum life of the LEDs. The LEDs may be activated when a suitable voltage is applied. By virtue of the LEDs being positioned in areas on the pair of hand-held controllers 100 detectable to the camera 210, motion of the light produced by the LEDs that is detected by the camera 210 is used as an indication of the positions and motion of the pair of hand-held controllers 100. In this way, motion of the pair of hand-held controllers is tracked by the camera 210, allowing for corresponding virtual-reality hand motions to be shown. For example, when the user makes a punching motion while playing a boxing game, movement of the LEDs in a manner corresponding to a punch may be detected and used to model the user's motion.

In some embodiments, the first and second cages 140 and 142 may be formed of an over-molded rubber material so as to have a surface providing sufficient friction with the user's palms, thus improving the grip. In some embodiments, the first and second cages 140 and 142 may be formed of a hard plastic, including, but not limited to high density polyethylene providing increased rigidity in structure. Additionally, any other suitable materials may be used.

In some embodiments, the first cage 140 may be detachably coupled to at least one of the first user-input surface 110 and the first grip 130, and the second cage 142 may be detachably coupled to at least one of the second user-input surface 112 and the second grip 132. The first and second cages 140 and 142 may each be slidably coupled to the respective first and second user-input surfaces 110 and 112 through a protrusion, spanning a width of each end portion of the respective cages 140 and 142, being slidably engaged with a corresponding groove positioned on an outer circumference of the respective first and second user-input surfaces 110 and 112. This configuration yields the advantage of separating the aforementioned components for calibration as necessary. Detachable coupling of the components also allows for a separate and potentially cheaper manufacturing process of the parts. Furthermore, detachable coupling of the first and second cages 140 and 142 to at least one of the respective user-input surfaces 110 and 112 and the respective first and second grips 130 and 132 allows for separation of the aforementioned components upon dropping of the pair of hand-held controllers 100, thereby reducing the need to replace the entire unit upon damage, but instead allowing the separate damaged parts to be fixed or replaced.

In some embodiments, the first hand-held controller 102 may further comprise a structural web 195 coupling the first cage 140 to the first user-input surface 110 and the second hand-held controller 104 may further comprise a structural web 197 coupling the second cage 142 to the second user-input surface 112. The structural webs 195 and 197 provide further rigidity in structure to the respective coupling between the first cage 140 and the user-input surface 110 and between the second cage 142 and the user-input surface 112 to mitigate damage and separation of these components upon dropping of the pair of hand-held controllers 100 by the user.

In some embodiments, the pair of hand-held controllers 100 further comprises a third user-input key 190 on the first user-input surface 110, and a fourth user-input key 192 on the second user-input surface 112 (i.e., the first hand-held controller 102 further comprises the third user-input key 190 and the second hand-held controller 104 further comprises the fourth user-input key 192). The third user-input key 190 is a trigger mounted on at least one of the first structural web 195 and the first grip 130 at a position configured to be actuated by a middle finger of the user. The fourth user-input key 192 is another trigger mounted on at least one of the second structural web 197 and the second grip 132 at a position configured to be actuated by another middle finger of the user. The aforementioned configuration yields the advantage that each trigger is positioned adjacent to a location of a user's finger (e.g., middle finger) when the first and second grips 130 and 132 are held in the neutral position. In some embodiments, each trigger may be both pushed and pulled by the middle finger, thus providing increased control in manipulating each trigger to achieve a desired action.

In some embodiments, the first hand-held controller 102 is identical to the second hand-held controller 104, but for positions of at least one of the user-input keys and the grips, so as to be adapted specifically for either a left or right hand in which the respective hand-held controller 102 or 104 is to be held. The first hand-held controller 102 thus may be a right-handed controller and the second hand-held controller 104 may be a left-handed controller, or vice-versa.

In other embodiments, the first and second hand-held controllers 102 and 104 are agnostic with respect to handedness (e.g., with both hand-held controllers having the same configuration of user-input keys, or with the first hand-held controller having a configuration of user-input keys different than the second hand-held controller).

In some embodiments, a first hand-held controller 102 for a virtual-reality system comprises a first user-input surface 110 having a first user-input key 120A, a first grip 130 and a first cage 140 having a first connector 114 coupled to a surface of the first cage 140. The first connector 114 is configured to detachably couple to a second connector 116 on a second cage 142 of a second hand-held controller 104.

In some embodiments, a pair of hand-held controllers for a virtual-reality system may comprise a first hand-held controller 102 and a second hand-held controller 104. The first hand-held controller 102 may comprise a first user-input surface 110 having a first user-input key 120A, a first grip 130, and a first cage 140 having a first connector 114 coupled to an outer surface 145 of the first cage 140. The second hand-held controller 104 may comprise a second user-input surface 112 having a second user-input key 122A, a second grip 132, and a second cage 142 having a second connector 116 coupled to an outer surface 147 of the second cage 142.

The first and second connectors 114 and 116 are configured to detachably couple the first cage 140 to the second cage 142 as previously described above. The first cage 140 and the second cage 142 each comprise a plurality of illumination sources 150 on the outer surfaces 145 and 147 of the first cage 140 and the second cage 142, respectively, as previously described above.

Figure 3:
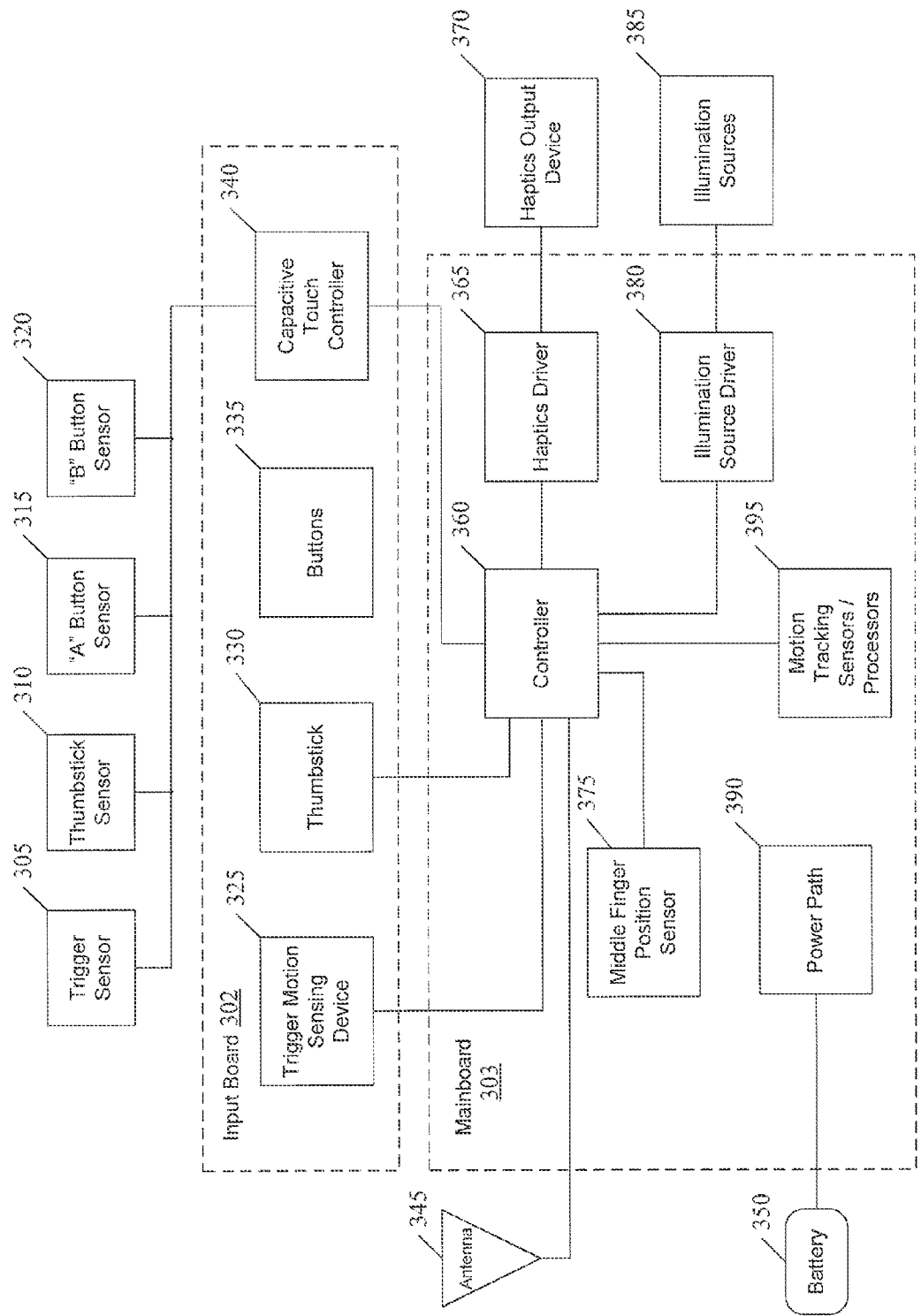
FIG. 3 is a block diagram illustrating an electrical configuration of the exemplary pair of hand-held controllers in accordance with some embodiments.

FIG. 3 is a block diagram illustrating an electrical configuration of a hand-held controller (e.g., first or second hand held controller 102 or 104) of the pair of hand-held controllers 100 in accordance with some embodiments. The electrical configuration of the first hand-held controller 102 is similar to that of the second hand-held controller 104; therefore, the following description applies to both hand-held controllers 102 and 104. Each hand-held controller of the pair of hand-held controllers includes an input board 302 and a main board 303 coupled to the input board 302. The input board 302 includes a trigger motion sensing device 325, a thumbstick 330, buttons 335, and a capacitive touch controller 340. In other examples, the input board 302 may include additional or alternative user-input keys. The trigger motion sensing device 325 detects user activation of a trigger (e.g., trigger 190 or 192).

The capacitive touch controller 340 is coupled to multiple sensors such that the input board 302 receives sensed signals from capacitive sensors resulting from a user's touch. For example, the capacitive sensors include a trigger sensor 305, a thumbstick sensor 310, an "A" button sensor 315, and/or a "B" button sensor 320. For example, the trigger sensor 305 may sense when a user touches the trigger (e.g., trigger 190 or 192). Similarly, the thumbstick sensor 310 senses a signal resulting from the user touching the thumbstick 310. Further, the button sensors 315 and 320 sense signals resulting from user touching the buttons 335. Other capacitive sensors may be included for other user-input keys (e.g., a directional pad).

The mainboard 303 includes a controller 360, a haptics driver 365, a middle finger position sensor 375, power path 390, motion tracking sensors/processors 395 and an illumination source driver 380. The haptics driver 365 drives a haptics output device 370 that provides haptic effects. An example of the haptics output device 370 includes a short vibration feedback device that, when activated, causes the hand-held controller to vibrate.

The mainboard 303 is coupled to an antenna to wirelessly receive and transmit signals. Each of the hand-held controllers (e.g., hand-held controller 102 or 104) thus may be wireless. The mainboard 303 is also coupled to a power source (e.g., a battery 350) to provide power to the hand-held controller. The power may be supplied to the mainboard 303 through a power path 390.

The illumination source driver 380 (e.g., LED driver) drives illumination sources 385 (e.g., LEDs on the outer surfaces of the cage 140 or 142) under the control of the controller 360, and thus turns the illumination sources 385 on or off.

The middle finger position sensor 375 senses a position of the middle finger (e.g. when a user activates the trigger 190 or 192) and this information is processed by the controller 360. The motion tracking sensors/processors 395 include a plurality of motion sensors (e.g. accelerometers and/or gyroscopes) which tracks motion of the controller based on motions made by the user.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A pair of hand-held controllers for a virtual-reality system, the pair of hand-held controllers comprising:
a first hand-held controller comprising:
a first user-input surface having a first user-input key;
a first grip;
a first cage having a ring shape that is coupled to the first user-input surface at first and second points, without the first grip being interposed between the cage and the first point, and without the first grip being interposed between the cage and the second point; and
a first connector coupled to an outer surface of the ring shape of the first cage; and
a second hand-held controller comprising:
a second user-input surface having a second user-input key; a second grip;
a second cage having a ring shape that is coupled to the second user-input surface at third and fourth points, without the second grip interposed between the cage and the third point, and without the second grip being interposed between the cage and the fourth point; and
a second connector coupled to an outer surface of the ring shape of the second cage, wherein the first and second connectors are configured to detachably couple the first cage to the second cage; and
wherein the first cage and the second cage each comprise a plurality of illumination sources on the outer surfaces of the first cage and the second cage respectively.

2. The pair of hand-held controllers of claim 1, wherein the first and second connectors are configured to detachably couple the first cage to the second cage at a first position on the first cage and a corresponding second position on the second cage.

3. The pair of hand-held controllers of claim 2, wherein the first and second connectors comprise first and second magnets to magnetically couple the first cage and the second cage to each other at the first and second positions.

4. The pair of hand-held controllers of claim 2, wherein:
the first connector comprises a hook surface of a hook-and-loop fastener at the first position; and
the second connector comprises a loop surface of the hook-and-loop fastener at the second position.

5. The pair of hand-held controllers of claim 2, wherein:
the first connector comprises a first disc at the first position, the first disc configured to have a protrusion protruding from a surface of the first connector;
the second connector comprises a second disc at the second position, the second disc configured to have a groove at a position on a surface of the second disc corresponding to a position of the protrusion on the first disc; and
the first cage and the second cage are coupled by insertion of the protrusion into the groove.

6. The pair of hand-held controllers of claim 5, wherein the first and second connectors comprise snap fasteners.

7. The pair of hand-held controllers of claim 2, wherein:
the first connector comprises an adhesive on a first surface of the first connector to couple the first connector to the first cage and an adhesive on a second surface of the first connector;
the second connector comprises an adhesive on a first surface of the second connector to couple the second connector to the second cage and an adhesive on a second surface of the second connector; and
the adhesives on the second surfaces of the first and second connectors are to detachably couple the first and second connectors.

8. The pair of hand-held controllers of claim 1, wherein at least a portion of the plurality of illumination sources on each of the first and second cages are positioned to be visible to a forward-looking camera on a head-mounted display worn by a user when the user holds the first and second grips in a neutral position.

9. The pair of hand-held controllers of claim 1, wherein the plurality of illumination sources on each of the first and second cages comprises a plurality of light-emitting diodes (LEDs).

10. The pair of hand-held controllers of claim 9, wherein:
the first hand-held controller further comprises a first power source to supply power to the first user-input surface and the plurality of LEDs on the first cage; and
the second hand-held controller further comprises a second power source to supply power to the second user-input surface and the plurality of LEDs on the second cage.

11. The pair of hand-held controllers of claim 1, wherein the plurality of illumination sources on each of the first and second cages comprises a plurality of passive reflectors.

12. The pair of hand-held controllers of claim 1, further comprising a first structural web coupling the first cage to the first user-input surface and a second structural web coupling the second cage to the second user-input surface.

13. The pair of hand-held controllers of claim 12, further comprising:
a third user-input key mounted on at least one of the first structural web and the first grip, and
a fourth user-input key mounted on at least one of the second structural web and the second grip,
wherein the third user-input key is a trigger positioned to be actuated by a middle finger of the user, and
the fourth user-input key is a trigger positioned to be actuated by another middle finger of the user.

14. The pair of hand-held controllers of claim 1, wherein each of the first and second user-input keys is selected from the group consisting of a thumbstick, a button, a trigger, and a directional pad.

15. The pair of hand-held controllers of claim 1, wherein:
the first user-input surface comprises a first plurality of user-input keys including the first user-input key;
the second user-input surface comprises a second plurality of user-input keys including the second user-input key; and
respective user-input keys of the first and second pluralities of user-input keys are selected from the group consisting of a thumbstick, a button, a trigger, and a directional pad.

16. The pair of hand-held controllers of claim 1, wherein the first and second cages each comprise an over-molded rubber material or a hard plastic.

17. A first hand-held controller for a virtual-reality system, the first hand-held controller comprising:
a first user-input surface having a first user-input key;
a first grip;
a first cage having a ring shape that is coupled to the first user-input surface at first and second points, without the first grip being interposed between the cage and the first point, and without the first grip being interposed between the cage and the second point; and
a first connector coupled to an outer surface of the ring shape of the first cage;
wherein the first connector is configured to detachably couple to a second connector on a second cage of a second hand-held controller; and
wherein the first cage comprises a plurality of illumination sources on the outer surface of the first cage.

* * * * *